(12) United States Patent
Dondeti et al.

(10) Patent No.: US 7,590,074 B1
(45) Date of Patent: Sep. 15, 2009

(54) METHOD AND APPARATUS FOR OBTAINING ROUTING INFORMATION ON DEMAND IN A VIRTUAL PRIVATE NETWORK

(75) Inventors: Lakshminath Dondeti, Chelmsford, MA (US); Donald Fedyk, Groton, MA (US); Ravi Ravindran, Ottawa (CA); Hong Zhang, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 572 days.

(21) Appl. No.: 11/001,815

(22) Filed: Dec. 2, 2004

(51) Int. Cl.
*H04L 12/28* (2006.01)
(52) U.S. Cl. ........................ 370/254; 370/401
(58) Field of Classification Search ............... None
See application file for complete search history.

(56) References Cited

U.S. PATENT DOCUMENTS

| | | | | |
|---|---|---|---|---|
| 6,970,464 | B2* | 11/2005 | Xu et al. | 370/392 |
| 7,274,704 | B1* | 9/2007 | Ould-Brahim et al. | 370/409 |
| 7,373,660 | B1* | 5/2008 | Guichard et al. | 726/15 |
| 7,411,955 | B2* | 8/2008 | Li et al. | 370/392 |
| 2002/0186664 | A1* | 12/2002 | Gibson et al. | 370/254 |
| 2004/0088542 | A1* | 5/2004 | Daude et al. | 713/156 |
| 2006/0056314 | A1* | 3/2006 | Daures | 370/254 |

OTHER PUBLICATIONS

D. Harkins, et al., Internet Engineering Task Force (IETF) Request For Comments (RFC) 2409, *The Internet Key Exchange (IKE)*, (Nov. 1988) 39 pages.
C. Kaufman, IETF-ID, *Internet Key Exchange (IKEv2) Protocol*, draft-ietf-ipsec-ikev2-13 (Mar. 2004) 126 pages.

* cited by examiner

*Primary Examiner*—Michael J Moore, Jr.
(74) *Attorney, Agent, or Firm*—Anderson Gorecki & Manaras LLP

(57) ABSTRACT

Routing information may be provided to VPN sites on demand to allow smaller VPN sites with smaller routing tables to communicate directly with other VPN sites. This allows the meshed VPN architecture to scale to a size larger than where each VPN site is required to store routing information for all other VPN sites. A route server is instantiated on the network, optionally in connection with a Group Controller Key Server, to manage distribution of routes on the network and to provide routes to VPN sites on demand. As routes are learned by the VPN sites they are advertised to the route server, which selectively advertises the routes to other VPN sites depending on the per-site preferences. When a VPN site needs routing information to communicate with another VPN site, the network element will check its routing table for the route, and if the route is not available, will obtain the route on-demand from the route server.

19 Claims, 5 Drawing Sheets

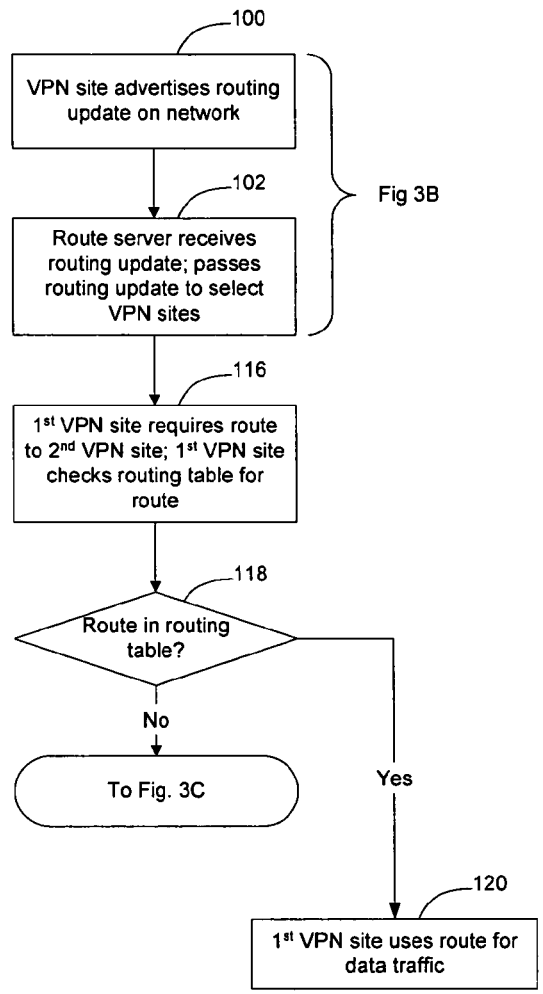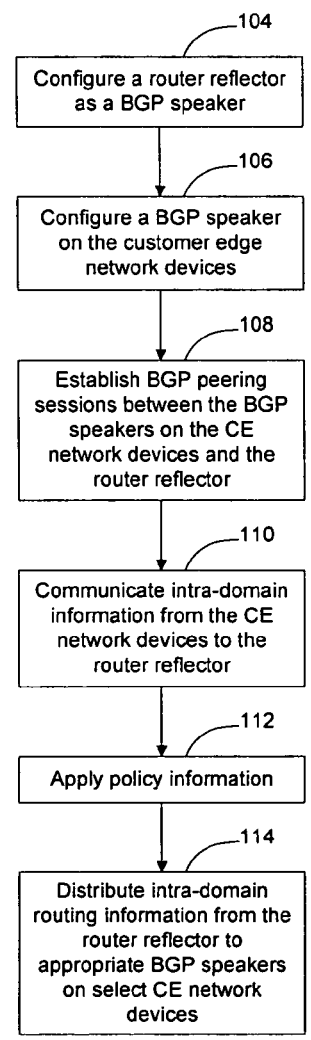

METHOD AND APPARATUS FOR OBTAINING ROUTING INFORMATION ON DEMAND IN A VIRTUAL PRIVATE NETWORK

BACKGROUND OF THE INVENTION

1. Field of the Invention

The present invention relates to communication networks and, more particularly, to a method and apparatus for obtaining routing information on demand in a virtual private network.

2. Description of the Related Art

Data communication networks may include various computers, servers, nodes, routers, switches, hubs, proxies, and other devices coupled to and configured to pass data to one another. These devices will be referred to herein as "network elements." Data is communicated through the data communication network by passing protocol data units, such as packets, frames, cells, or segments, between the network elements by utilizing one or more communication links. A particular packet may be handled by multiple network elements and cross multiple communication links as it travels between its source and its destination over the network. The communication links may be wireless links, metal wired links, optical links, or formed using other communication technologies.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, and how the protocol data units should be handled or routed through the network by the network elements.

A Virtual Private Network (VPN) may be formed to connect two or more networks or network elements over a private or public network. A VPN may be formed using encryption, which protects the data from being viewed if intercepted by an unintended third party, or using encapsulation which protects the data by putting the data on a special path through the network that is unavailable to unintended third parties. One common encapsulation method is to attach a unique label that may be used to place the traffic on a label switched path formed on a Multiprotocol Label Switching (MPLS) network.

Using VPN tunnels to transport traffic enables geographically separated network elements to communicate securely over an otherwise insecure environment without requiring the network participants to lease dedicated lines through the network. As used herein, the term "autonomous network" will be used to refer to a network or group of networks under a common administration and with common routing policies. The term "VPN site" will be used to refer to a network or portion of a network that is to be connected to a VPN tunnel. VPN sites situated on opposite ends of a VPN tunnel may be autonomous networks, parts of different autonomous networks, or parts of the same autonomous network.

The network connectivity service provider, such as an Internet service provider (ISP), may provide services to facilitate establishment of VPN tunnels over the network. For example, the connectivity provider may configure the customer edge network elements in such a way that the customers may transparently run routing protocols to configure static routes through the VPN tunnels. Additionally, the ISP may manage distribution of inter-site reachability information and take other actions to establish the VPN network for the subscriber.

Routing within an autonomous network (intra-site reachability information) is typically handled by the VPN customer. An autonomous network, such as may be used by a university or corporation, will generally employ an interior gateway protocol such as RIP (Routing Information Protocol), OSPF (Open Shortest Path First), or Interior Border Gateway Protocol (IBGP) to exchange routing information between network elements within the network attached to the site.

To enable devices on one VPN site to communicate with devices on another VPN site via the VPN tunnel, it is necessary to exchange routing information between the two VPN sites. Likewise, as network elements are added and removed from the networks, or as problems are encountered and fixed in the networks, the routing tables need to be updated and advertised to the other participating sites in the VPN. This may be accomplished in a variety of ways, such as by running OSPF or RIP through the tunnel. Another way this may be accomplished is to treat each VPN site as an autonomous network, and to exchange routing information between the VPN sites using a protocol designed to exchange routing information between autonomous networks, such as Border Gateway Protocol (BGP).

In a meshed VPN architecture topography, each VPN site may be allowed to communicate directly with multiple other VPN sites. In this topography, each site needs to be aware of and maintain n−1 routing adjacencies, which does not scale well and causes configuration problems. Additionally, requiring each VPN site to maintain routing information received from each of the other VPN sites may cause the routing tables at each of the sites to grow excessively large. While some of the network elements may be capable of storing large numbers of routes in their routing tables, other network elements at other smaller VPN sites may be capable of only storing hundreds or thousands of routing table entries. For example, a bank may have a central office and thousands of branch offices. While the main office may have a rather large gateway with a large memory that is able to store many routes, some of the branch offices may have much small gateway capable of storing a limited number of routes in their routing tables.

In this and other instances, requiring the VPN sites to maintain adjacencies with all other cites in the VPN and exchange routing information prevents the size of the VPN network from scaling. Accordingly, although meshed VPN architectures may be preferred in particular instances, such topographies may be eschewed for other VPN architectures, such as hub and spoke architectures, due to limitations associated with particular VPN sites.

SUMMARY OF THE INVENTION

The present invention overcomes these and other drawbacks by providing a method and apparatus for allowing the exchange of routing information on demand in a virtual private network. According to an embodiment of the invention, a route server is instantiated on the network, optionally in connection with a Group Controller Key Server (GCKS), to manage distribution of routes according to VPN site preferences and to provide routes to VPN sites on demand. As routes are learned by the VPN sites they are advertised to the route server, which selectively advertises the routes to other VPN sites depending on the per-site preferences. This allows larger sites to obtain regular routing updates to populate their routing tables while allowing smaller sites to only receive routing updates containing relevant routing information. When a network element at a VPN site needs routing information to communicate with another VPN site, the network element will check to see if it has the required routing information and, if not, may obtain the route on-demand from the route server. The route request message may be a data message or control message. Upon receipt of the route request message, the route server will cause routing information to be transmitted to the initiating VPN site, and optionally transmitted to the intended recipient VPN site to allow the VPN sites to update their routing tables and pass data directly to each other. Where a GCKS is used in connection with the route server, VPN information such as encryption information and encapsulation may be distributed as well.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIGS. 3A-3C together form a flow-chart illustrating several methods for exchanging routing information on demand according to an embodiment of the invention;

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, the method and apparatus of the present invention enables routing information, and optionally VPN information, to be exchanged on demand to increase the scalability of a mesh topography or other topography Virtual Private Network (VPN). According to an embodiment of the invention, routes learned at VPN sites are advertised on the network and passed to a Group Controller Key Server (GCKS)/route server or other centralized repository of information on the network. When a VPN site is to communicate with another VPN site, it contacts the centralized repository to obtain route information to be used to communicate with the other VPN site. Several different ways of contacting the centralized repository are discussed in greater detail below. Once the routing information is passed to the VPN site, the new route information may be used by the VPN site to communicate directly with the other VPN site as if the sites were configured in a meshed VPN network architecture.

Figure 1:
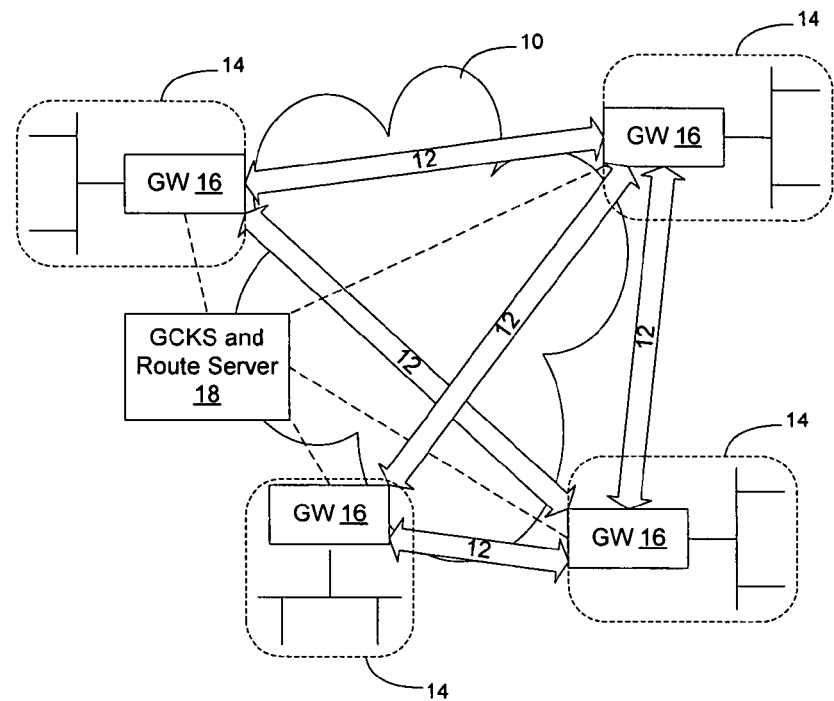
FIG. 1 is a functional block diagram of a network including a GCKS/route server according to an embodiment of the invention.

One example of a communication network 10 employing VPN tunnels 12 to interconnect VPN sites 14 is illustrated in FIG. 1. As shown in FIG. 1, VPN tunnels 12 may be used to interconnect two or more VPN sites across a public network, such as the Internet, using any conventional means. A gateway 16 including a VPN server may be installed at the interface between the network 10 and a network associated with the VPN site. In the example illustrated in FIG. 1, four customer VPN sites 14 are interconnected in a meshed architecture by tunnels 12. The architecture may be fully meshed or partially meshed, as illustrated. As discussed above, each of the gateways 16 will learn routes on their attached local area networks and advertise those routes on the network. According to an embodiment of the invention, the routes are advertised to a Group Controller Key Server (GCKS) and route server 18, which may selectively re-advertise the routes or make the routes available on an as-needed basis. Allowing the routes to be advertised through a route server allows each gateway to use a single peering session to advertise routes to all other gateways on the VPN. Allowing the routes to be re-advertised selectively allows all routes, or a particular subset of routes, to be sent to those VPN sites that are able to store a larger number of routes, while allowing smaller VPN sites with less route learning capabilities to obtain routes on an as-needed basis so that their relatively smaller routing tables may be selectively populated with relevant route information.

The VPN tunnels may be any type of tunnel, such as a VPN tunnel formed via encapsulation on a MPLS network, or any other type of tunnel formed by encapsulation, encryption, or via some alternative means. While this invention will be described as using VPN tunnels configured to carry traffic over a public network such as the Internet, it should be apparent that the invention is not limited to VPN tunnels or to transmission over a public network, but rather extends to other types of virtual circuits formed over any type of communications network. Likewise, while four VPN sites are illustrated in this network as being interconnected via five VPN tunnels, the invention is not limited to a network of this topography, as any number of VPN sites and VPN tunnels may be employed.

Numerous routing protocols may be used to exchange routing information between the VPN sites. Where Border Gateway Protocol (BGP) is used to exchange routing information, a BGP router reflector may be implemented on the GCKS/route server 18 to host BGP peering sessions with all or a selected subset of the gateways associated with the VPN sites. In this manner, the route server may collect routing information and selectively forward the routing information to other gateways, as required or according to the policy instantiated in the GCKS/route server. Although several examples of implementations based on BGP will be provided herein, the invention is not limited in this manner as other routing protocols may be used as well.

The GCKS/route server 18 may be located at any convenient location on the network. For example, the route server may be instantiated in an independent computer or network element hosted by one of the VPN sites, the connectivity provider, or an independent third party. Alternatively, the GCKS/route server may be instantiated as a process running on another computer or network element forming part of the data communications network or the virtual private network. The invention is thus not limited to implementation of the GCKS/route server in any particular location on the network or in any particular type of network element on the communication network.

To manage the VPN services, the service provider generally maintains a centralized VPN management center. The VPN management center generally functions to configure the customer edge (gateway) network elements, handle communications between VPN customers and the service provider, monitor the status of the VPN networks, and provide any other services necessary or convenient to the VPN network and customers. Optionally, the GCKS/route server may be collocated with the service provider's VPN management center to facilitate communications between the GCKS/route server and the other devices in the VPN management center, although the invention is not limited in this regard.

In the embodiment illustrated in FIG. 1, the GCKS/route server is illustrated as connecting with gateway network elements that are all part of the same virtual private network. The GCKS/route server may, however, work with multiple VPN networks and communicate with customer edge and gateway network elements belonging, for example, to different companies or to different end users. The invention is not limited to a GCKS/route server communicating with a single set of VPN sites. Thus, for example, the GCKS/route server illustrated in FIG. 1 may additionally be configured to coordinate the exchange of inter-domain network routing information for other sets of VPN sites (not shown) that are not connected via VPN tunnels to the illustrated VPN sites. Alternatively, separate GCKS/route server processes may be instantiated on a common network element to allow a virtual dedicated GCKS/route server to be provided for each VPN hosted by the network element.

Figure 2:
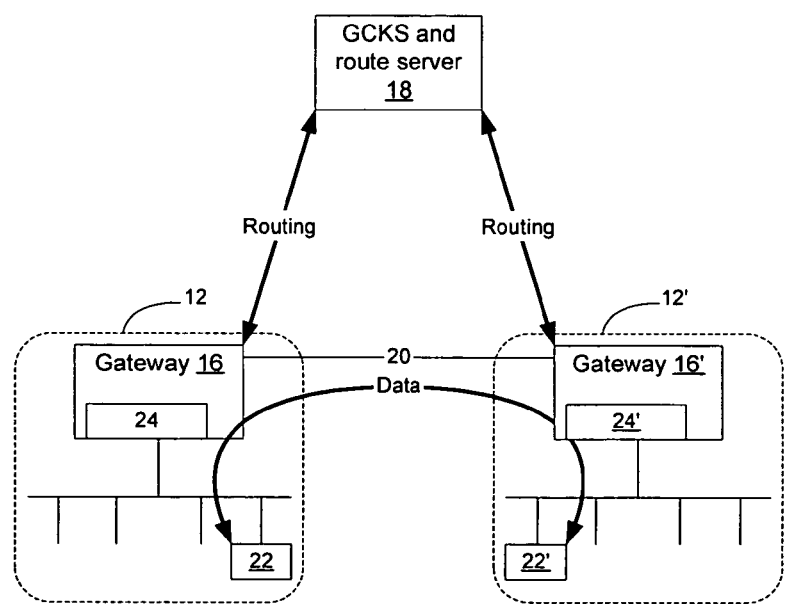
FIG. 2 is a functional block diagram of a portion of the network of FIG. 1 in greater detail and illustrating the routing and data paths on the network.

FIG. 2 illustrates the routing and data paths through the network in greater detail. As shown in FIG. 2, gateway network elements 16 are interconnected over a communication network over one or more communication links 20. The link 20 may include one or more intermediate nodes, although for simplicity a direct link has been shown to avoid obfuscation of the invention. To allow a network element 22 on one VPN site 12 to communicate with another network element 22' on another VPN site 12', the gateways 16, 16' generally require route information specifying the path between the network elements. Specifically, the sending network element 22 will need to know the path through the network to the other network element 22', so that the data packets may be properly routed to the appropriate destination. Once the route information has been installed in routing tables 24, 24', data may be passed between the network elements. Where the communication is to be protected using a virtual private network, other information will need to be exchanged as well, such as encryption and encapsulation information. This information will be referred to herein as VPN information and will be described herein as being provided by the GCKS. The invention is not limited in this manner, however, as other ways of distribution this information may be used as well. Optionally, the VPN information may be exchanged in connection with the routing information provided by the route server, for example as part of the same message, although the invention is not limited in this manner either.

According to an embodiment of the invention, route information learned by the gateways 16, 16' are transmitted to a common route server and the advertised routes are selectively distributed to other VPN sites according to policy implemented at the route server. Numerous policies may be implemented and the invention is not limited to any particular type of policy. For example, the route server may be configured to advertise all learned routes to a VPN hub site or other large VPN site, may be configured to advertise a particular subset of routes to another subset of VPN sites, and may be configured to advertise particular routes to particular VPN sites only when requested. In this manner, the number of routes advertised to any particular VPN site may be controlled to maintain relevant routes in that VPN site's routing table. This allows a meshed VPN architecture to be implemented without causing scalability problems as the number of VPN sites grows. The advertised routes may be of any desired granularity or consolidation level, and the invention is not limited to advertising any particular type of route.

Figure 4:
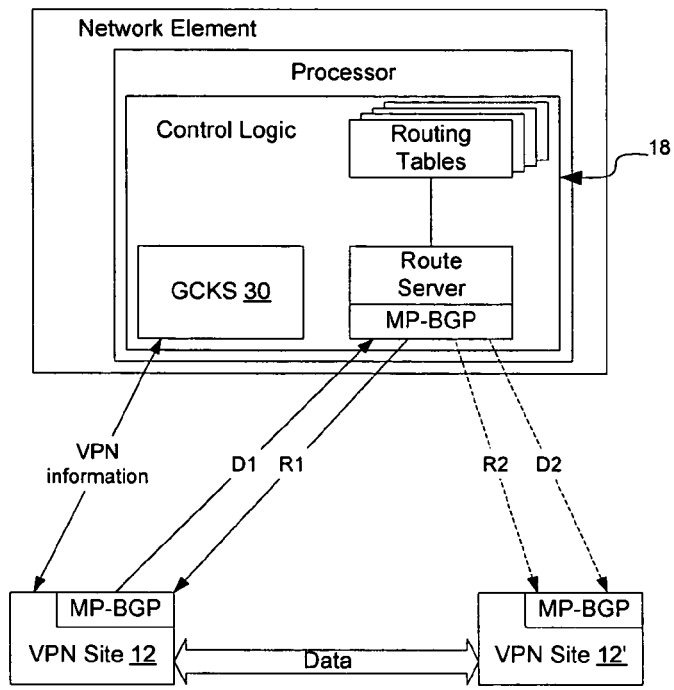
FIGS. 4-6 are functional block diagrams of a portion of a VPN network and illustrating the routing and data paths on the network.
Figure 5:
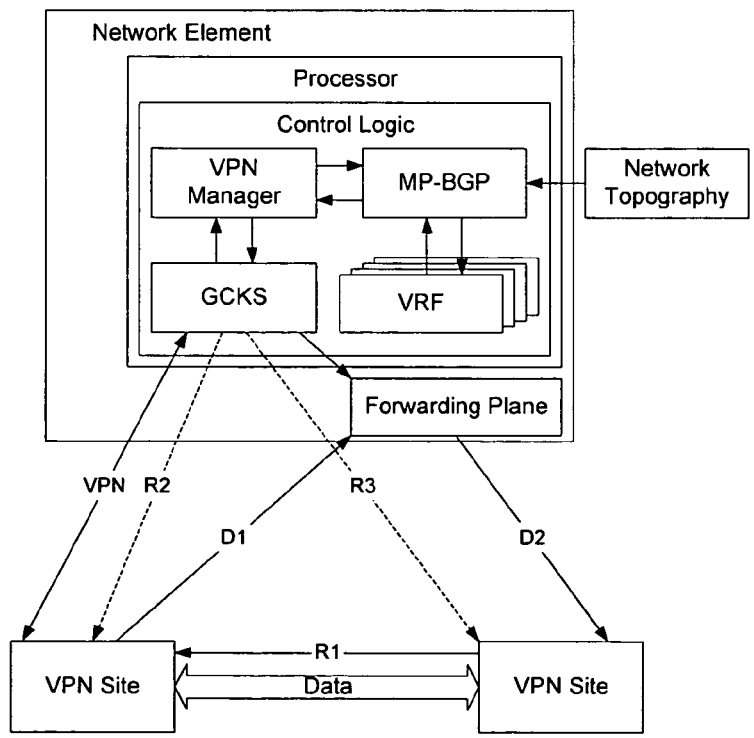
Figure 6:
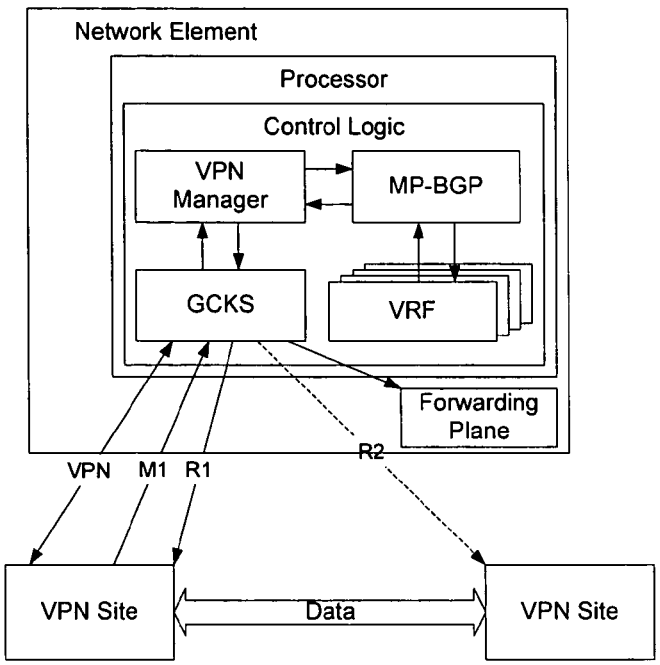

In the embodiment of FIG. 2, when the network element 22 needs a route to network element 22', the gateway 16 obtains the route from GCKS/route server 18, and uses the route to communicate with network element 22'. The flow chart in FIGS. 3A-3C and the functional block diagrams in FIGS. 4-6 illustrate several ways in which this may be accomplished. The invention is not limited to theses several examples, however, as other manners of requesting and obtaining route information on demand in a VPN may be used as well.

Figure 3C:
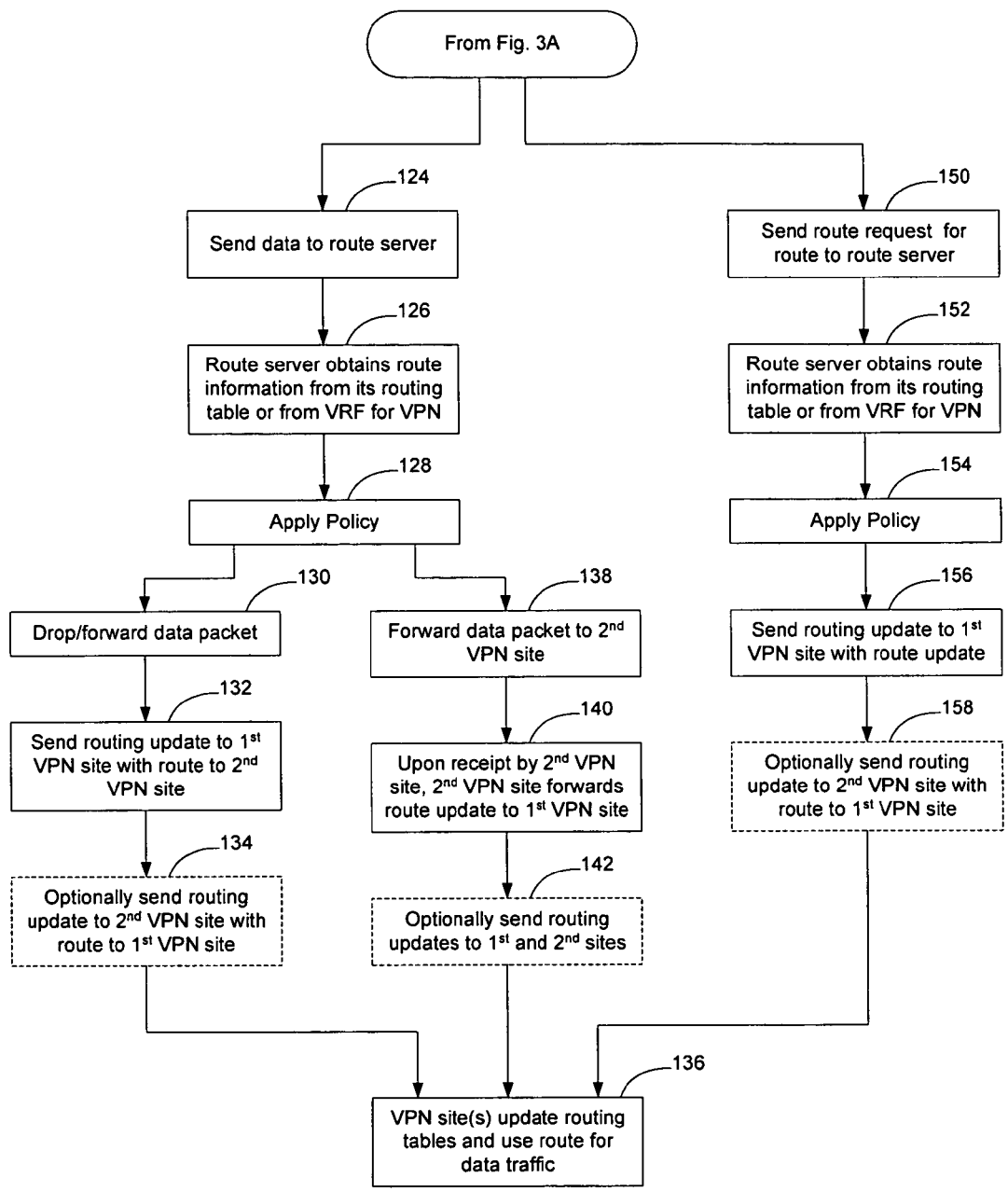

FIGS. 3A-3C illustrate a flow-chart of a method of exchanging routing information according to an embodiment of the invention. As shown in FIG. 3A, when a VPN site receives a new route that is to be advertised, it advertises the route using a routing update on the network (100). The route server receives the routing update and passes the routing update to select VPN sites according to the policy implemented in the route server (102). An example of a process (using BGP as a routing protocol to exchange routes between gateways configured as customer edge network elements), that may be followed in connection with advertising a route to a route server and advertising the route from the route server to other VPN sites, is discussed in greater detail in related U.S. patent application Ser. No. 10/222,059, entitled Method And Apparatus For Exchanging Intra-Domain Routing Information Between VPN Sites, the content of which is hereby incorporated by reference. FIG. 3B illustrates a portion of the process discussed in greater detail in this above-referenced patent application. The invention is not limited to using BGP to advertise routing information or to the particular methods discussed in this related U.S. patent application.

As shown in FIG. 3B, where the routing information is to be exchanged using BGP, a router reflector is configured in the network as a BGP speaker (104). The BGP router reflector may be configured on a network element or computer owned by the ISP, or on any other convenient network element or computer as discussed above. While a single BGP router reflector may be configured, as illustrated in FIG. 1, additional router reflectors may also be configured to provide redundancy should there be a problem with the primary BGP router reflector or with obtaining access to the primary BGP router reflector.

Once the GCKS/route server is configured to host BGP peering sessions, a BGP speaker is configured on each of the gateway network elements (106), and a pair of BGP peers is configured between each of the gateway network element BGP speakers and the BGP speaker on the GCKS/route server (108). Specifically, when the gateway network element is first set up, a BGP speaker will be configured on the customer edge network element and a pair of BGP peers will be simultaneously or subsequently configured between the gateway network element and the BGP speaker associated with the GCKS/route server. The BGP peering session between the gateway network element and the GCKS/route server can be set up through a public channel using the gateway network element's public IP address, through a secure VPN management channel, or through any other convenient channel.

Once the peering session has been set up, the gateway network element communicates its site's reachability information (intra-domain network routing information), as well as dynamic changes to this information, to the GCKS/route server. In one embodiment, the gateway network element collects the intra-domain network and routing information from the routing protocol in use on the VPN site. Examples of interior routing protocols include RIP, OSPF, IBGP, although the invention is not limited to the use of any particular protocol or one of these several identified interior potential protocols. The gateway network element translates this routing information into a format acceptable for transmission between domains, for example via the BGP peering session or using another inter-domain routing protocol, and communicates the intra-domain routing information to the GCKS/route server through the BGP peering session that has previously been established (110).

When advertising a route, a gateway network element attaches the VPN information to the route indicating, if a VPN site belongs to more than one VPN, through which VPN the route can be reached. The VPN information can be identified, for example, using a VPN ID that is used in other types of provider provisioned virtual private networks, or using any other conventional or convenient manner.

Policy information may be used to restrict access to particular routes on the gateway side of the BGP peering session, at the BGP router reflector, or both (112). For example, an VPN site may decide to apply policy information to the intra-domain routing information and only advertise the routes to destinations that are to be accessible from outside of the VPN site. In this scenario, the gateway network element would apply the policies and filter out routes that should not be advertised. Optionally, the policy may be applied by another network element associated with the VPN sites that is configured to provide the gateway network element with intra-domain routing information. The remaining routes, in this embodiment, are then sent to the GCKS/route server. Alternatively, the information as to which routes should be advertised and which should not be advertised may be communicated to the GCKS/route server, and responsibility for advertising only the correct results will rest at the GCKS/route server. This has the advantage of enabling the GCKS/route server to have a more complete picture of the network as a whole, but has the disadvantage of requiring the VPN site to share routing information which it may prefer to keep secret. Optionally, both types of policy information may be applied.

After intra-domain reachability information has been communicated from the customer edge network element to the service provider, the central BGP speaker associated with the GCKS/route server selectively distributes the site's reachability information to other appropriate VPN sites (114). Specifically, when the GCKS/route server receives a route from a VPN site, it first processes the route and updates its own database as a normal BGP speaker does. Then the GCKS/route server distributes the route to appropriate VPN sites according to the VPN information in the route and the policy information associated with the route and the preferences of the VPN sites. By allowing the VPN sites to provide preference information to the route server, the VPN sites may control the quality and type of route information that is to be advertised to them on a periodic basis.

Routing information to be distributed may take many forms and the invention is not limited to the particular type of routing information that is distributed. For example, a particular VPN site or class of VPN sites may be configured to receive all routing information from the route server, all route updates, updates for recently requested routes, select routes pertaining to particular sites on the VPN or pertaining to particular classes of sites on the VPN, or may be configured to receive no periodic routing updates. For example, the main branch of a bank may wish to receive all routing updates and may set its preference at the route server that all routing information be passed to it as it is received. A small branch may select to have no routes advertised to it, or to have routes only from related branches in the same city to be advertised to it. A functional branch of a corporation, such as human resources, may opt to have routes relating to that particular function to be distributed to their gateway on a periodic basis. Numerous other ways of establishing preferences may be used as well and the invention is not limited to a particular way of establishing preferences.

When distributing a route to other gateway network elements, the GCKS/route server may attach the related VPN tunnel information. The related VPN tunnel information may be considered an equivalent to the Next Hop attribute within a BGP route, which indicates to a VPN site over which tunnel the traffic should be reflected to reach the route.

The GCKS/route server optionally may update and distribute the reachability information whenever a VPN gateway status changes. Specifically, the GCKS/route server or service provider's VPN management center may be provided with the ability to monitor the status of a VPN gateway, for example by monitoring its own secure connection to the VPN gateway. When the status of a VPN gateway changes, for example if the status of the VPN gateway changes from up to down, the GCKS/route server may be instructed to update affected routes associated with the gateway. If the gateway is the only way to access a site, then all the routes from that site are withdrawn, and the GCKS/route server will notify the affected VPN sites to withdraw those routes. If the gateway is not the only gateway to the site, however, the GCKS/route server may attempt to choose an alternative routing path and attach the new VPN routing information to the routes and redistribute them to appropriate VPN sites. Likewise, when a VPN member leaves its group, the GCKS/route server may update related routes and communicate with affected sites to enable the affected sites to stop attempting to send data to the site that is leaving the VPN group.

After the routes are received by a gateway network element from the GCKS/route server, the gateway network element processes the route in a normal manner. Specifically, the gateway network element translates the received information from BGP format into a format appropriate for use by the local routing protocol, e.g., RIP, OSPF, or IBGP, and updates its router table with the new information. The gateway network element then populates the route within the site through the local routing protocol in a conventional manner.

Once routes have been advertised and collected by the route server, and selectively forwarded to appropriate VPN sites, the VPN sites can use the routes to communicate data on the communication network. With continuing reference to FIG. 3A, when a VPN site requires a route to another VPN site, the VPN site will first check its routing table 24 to see if the route is a known route (116). If the route is in the routing table (118) the VPN site will use the known route for the data traffic (120). Since, as indicated above, in one embodiment the route server will update distributed routes, the VPN site may rely on the route in its routing table. In another embodiment, where the route server does not update distributed route information, the VPN site may confirm the route or cause routes in its routing database to time out after a predetermined period of time.

If the route is not contained in the VPN site's routing table, the VPN site will obtain the route from the route server using one of the processes discussed below in connection with FIG. 3C, or as illustrated in one of the embodiments of FIGS. 4-6. Although several ways of obtaining routing information on demand will be discussed herein, other methods may be used as well and the invention is not limited to the particular examples provided herein.

As shown in FIG. 3C, when a VPN site does not know the route to an intended recipient VPN site, it may send data packets addressed to the intended recipient VPN site to the route server (124). Sending the data packets to the route server allows the transmitting VPN site to transmit data immediately without requiring the VPN site to be modified and configured to participate in messaging or signaling with the route server, as discussed in greater detail below in connection with other embodiments. For example, the VPN gateway may be configured with a default route pointing at the route server to allow it to forward traffic for all unknown routes to the route server.

In this embodiment, upon receipt by the route server of a data packet addressed to another VPN site in the VPN, the route server will obtain the route information from its routing table or Virtual Routing and Forwarding (VRF) table for that VPN (126). If the participants are part of the same VPN, the route server will obtain permission to distribute the route or forward the packet by applying VPN policy, optionally supplied by the GCKS (128). For example, the VPN may be established such that particular VPN sites are not allowed to communicate with each other. If the policy determination indicates that communication should not be allowed, the route server may drop the packet and notify the VPN site of the negative policy determination.

If the policy determination indicates that communication between the sites should be allowed, the route server may drop the packet (130) and send a routing update to the initiating VPN site with a route to the recipient VPN site (132) to allow subsequent data packets to be sent between the sites. The route may be a direct route to the recipient VPN site or may be an indirect route, such as a route through a VPN hub or a route through the GCKS/route server, which may be used to communicate with the recipient VPN site. Alternatively, the route server may forward the data packet, and any subsequently received data packets, to the recipient VPN site. While forwarding data packets on behalf of the VPN sites, the route server may also distribute a routing update to the initiating VPN site to allow it to start addressing packets using the routing update (132). Optionally, to enable faster bi-directional communication between the sites, the route server may also send a routing update to the second VPN site with a route to the initiating VPN site so that the recipient VPN site may pre-cache the route in its routing table for subsequent use in communications with the first VPN site (134). Once the VPN site(s) receive the routing updates, they update their routing tables and may use the routing information in connection with subsequent data traffic (136).

Alternatively, as shown in FIG. 3C, once the route server applies policy and determines that the data packet should be allowed to be forwarded on the network, the route server may forward the data packet to the recipient VPN site (138). Upon receipt by the recipient VPN site, the recipient VPN site may forward a route update to the initiating VPN site (140). In this manner, peer-to-peer routing updates may be exchanged directly between the sites to allow communications to take place between those sites. Optionally, the route server may additionally send a duplicate routing update to one or both of the sites (142) to ensure that the VPN sites have routing information and other information to communicate with each other over the VPN network. This may be useful, for example, where the route server acts in concert with the GCKS to distribute VPN information such as encryption keys and encapsulation information that may be used by the VPN sites to communicate with each other on the network. As before, once the routing tables are updated, the VPN sites may engage in communications over the network.

In the previous embodiments, the route server was able to infer from receipt of a data packet that the originating VPN server didn't have a route to the intended recipient and required route information to allow it to communicate with that VPN site. Alternatively, according to another embodiment of the invention, signaling may be used to allow the initiating VPN site to request that the route server provide a routing update with a particular address, particular range of addresses, or other routing information to enable the VPN site to communicate with another VPN site on the VPN network.

In this embodiment, after determining by an initiating VPN site that it doesn't have a route for another VPN site, it will send a route request for the route to the route server (150). The route request may take any form, including conventional network signaling, routing protocol signaling, an XML document including a request, or another form, and the invention is not limited to the particular type of messaging or signaling used to communicate the route request and route response messages on the network.

When the route server receives the request, it will obtain the route information from its routing table or from the VRF for that particular VPN (152) and apply policy (154) in a manner as described above. If the route server determines that communication should be allowed between the VPN sites, it will send a routing update to the initiating VPN site to transmit to that VPN site the required routing information, and optionally other information such as VPN information, to allow the VPN site to engage in secure communications with the other VPN site (156). Optionally, the route server may also send a routing update to the second VPN site with information to allow it to communicate with the initiating VPN site (158). The routing updates may take the form of routing advertisements or may take other forms and the invention is not limited to the particular form of the routing updates. As with the other embodiments, once the VPN site(s) have received the routing updates, they may use the routing information to route data traffic on the communication network (136).

FIGS. 4-6 illustrate the exchange of messages, including data packets and signaling, that may occur in connection with one or more of the embodiments illustrated in FIGS. 3A-3C and discussed above. In FIGS. 4-6, it will be assumed that an exchange has occurred between the GCKS 30 and the VPN sites 12 so that the VPN tunnels exist on the network. The GCKS may handle various aspects of establishing the VPN, including generating and distributing key exchange keys, data encryption keys, and other information required to establish secure channels between the GCKS and the sites, and between the VPN sites. Alternatively, this information may be passed in connection with transmission of routing information to the VPN sites as described in greater detail below. The invention is not limited to the order in which the information is exchanged.

In the embodiment illustrated in FIG. 4, when a VPN site is required to transmit data to another VPN site, the VPN site will send a data packet to the GCKS/route reflector (arrow D1). Upon receipt of the data packet, the GCKS/route reflector will look up route information for the data packet and pass the route information to the VPN site (arrow R1). The routing information to be passed to the VPN site 12 may be passed over a BGP peering session, described in greater detail above, or may be provided in another manner. The routing information will include information to allow the VPN site 12 to communicate with the VPN site 12 without passing through the GCKS/route server. Optionally, as mentioned above, the routing information may be combined with VPN information from the GCKS to specify how the communication should be formatted, encrypted, or encapsulated, to allow the data to pass over a VPN tunnel between the VPN sites 12, 12'.

Optionally, the GCKS/route server may forward the data packet to the second VPN site 12' (arrow D2) and may pass a routing information update to the VPN site (arrow R2). Forwarding the data packet to the VPN site 12' prevents data from being lost at the GCKS/route server. Forwarding a routing update to the VPN site 12' allows the VPN site 12' to update its routing tables and, where the routing update is accompanied by VPN information from the GCKS, may allow the VPN site to be provided with sufficient information to decrypt the traffic on the VPN tunnel that has been set up by the GCKS.

FIG. 5 illustrates another embodiment of the invention. As shown in FIG. 5, when a VPN site 12 needs to transmit data to another VPN site 12' but doesn't have sufficient routing information in its routing tables, it may forward a data packet to the GCKS/route server (arrow D1). Upon receipt of the data packet, the forwarding plane of the GCKS/route server will notify the control plane, either by passing the data packet or passing a message containing information about the data packet to the control plane, to enable the control plane to determine whether communication between the VPN sites should be allowed.

The control plane may have multiple cooperating modules to enable it to determine whether the communication should be allowed. For example, in the illustrated embodiment, the GCKS portion of the control plane has been illustrated as receiving notice from the data plane. The GCKS, in this embodiment, may consult a VPN Manager which, in turn, may consult a routing process to cause the routing process to access a VRF for the VPN. The invention is not limited in this regard, however, as other components may be used to determine whether communication between the VPN sites should be allowed. For example, in the embodiment illustrated in FIG. 5, the routing process is a Multi-Protocol Border Gateway Protocol (MP-BGP) process, although the invention is not limited in this manner as numerous processes may be used.

Once permission to send the data packet to the intended recipient VPN site has been obtained, and a route has been obtained from the routing process, the routing information is passed to the forwarding plane and used by the forwarding plane to forward the packet to the intended recipient VPN site 12' (arrow D2). Upon receipt of the data packet, the recipient VPN site 12' will update its routing tables with routing information obtained from the data packet and may then communicate directly with the initiating VPN site 12 (arrow R1).

Optionally, as shown in FIG. 5, the GCKS may also send routing updates to the initiating VPN site 12 (arrow R2) and recipient VPN site 12' (arrow R3), and also may interface with network elements in between the VPN sites, to provide the VPN sites with routing information and to establish a tunnel between the VPN sites. The invention is not limited in this manner, however.

FIG. 6 illustrates another embodiment of the invention in which a messaging environment is used to communicate between the initiating VPN site 12 and the GCKS/route server 18. In this embodiment, when an initiating VPN site determines a need for a route to a recipient VPN site, the VPN site will instantiate a messaging application to enable it to engage in a messaging session with the GCKS/route server 18. The messaging channel thus established may be used by the VPN site to transmit a request for routing information, and optionally for VPN information, and may be used by the GCKS/route server to respond with routing and/or VPN information. Specifically, as shown in FIG. 6, the initiating VPN site 12 will generate a message (arrow M1) and transmit the message to the GCKS/route server. The GCKS/route server will determine routing information to be passed to the initiating VPN site, and optionally may determine particular VPN information such as encryption keys and tunnel information, that may be passed to the initiating VPN site. The routing information (arrow R1) and optionally VPN information, will then be passed to the initiating VPN site. Upon receipt by the initiating VPN site, data traffic between the initiating and recipient VPN sites may commence. Optionally, the routing information may also be passed to the recipient VPN site (arrow R2).

Figure 7:
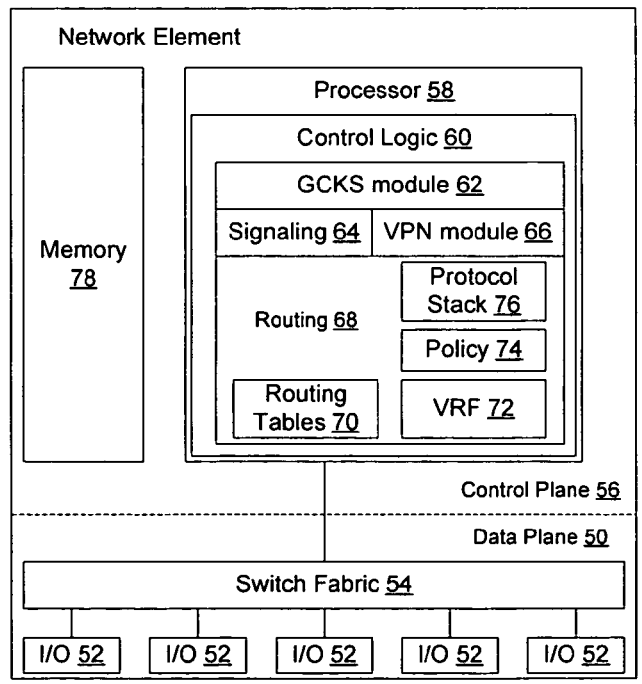
FIG. 7 is a functional block diagram of a GCKS and route server according to an embodiment of the invention.

One example of a GCKS/route server 18 according to an embodiment of the invention is illustrated in FIG. 7. As shown in FIG. 7, the GCKS/route server 18 in this embodiment includes a data plane 50 having a plurality of ports 52 interconnected by a switch fabric 54, and a control plane 56 configured to control operation of the data plane. Details of the data plane have been omitted as numerous conventional data plane may be used to handle traffic with the VPN sites.

The control plane includes at least one processor 58 containing control logic 60 configured to perform functions described herein in connection with the GCKS/route server. For example, the control logic may include a GCKS module 62 configured to perform tasks commonly associated with establishing VPNs on the network, performing group control for VPNs established on the network, and distributing keys to group members. The invention is not limited to the operations to be performed by the GCKS.

The control logic may also include a signaling module 64 to enable the GCKS/RS to engage in signaling on the network for example in connection with received route requests from VPN sites, and a VPN module 66 to allow the GCKS to monitor and maintain control over the VPNs created on the network. A routing module 68 may be provided to perform routing functions, such as collecting, and distributing routing information, maintaining routing tables 70, maintaining VRF tables 72 associated with VPNs on the network, and maintaining a policy database 74 containing per-site preferences as to how routing advertisements should be handled for that site. Additionally, a protocol stack 76 may be provided with the routing module to enable the network element to engage in protocol exchanges on the network. Other modules or substitute modules may be used as well and the invention is not limited to a GCKS/RS that has these particular modules.

A memory 78 may be provided, native to the processor or interfaced to the processor, to store data and instructions associated with the modules configured to implement the GCKS/route server described above. The memory may be part of the network element or may be formed as a removable storage device configured to enable the network element to be programmed to perform the functions described herein.

It should be understood that all functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation.

The control logic described herein, may be implemented as a set of program instructions that are stored in a computer readable memory within the network element and executed on a microprocessor. However, in this embodiment as with the previous embodiments, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of obtaining routing information on an as-needed basis, the method comprising the steps of:
   transmitting known routing information from a gateway to a route server, the routing information comprising intra-site reachability information associated with a network site on a network associated with the gateway; and
   in operation, when unknown routing information is needed by the gateway to transmit data to another network site on a network that is not associated with the gateway, actively obtaining the unknown routing information by the gateway from the route server on demand, by sending the data to the route server or by sending a request for the unknown routing information to the route server, to request the unknown routing information and thereby obtain the unknown routing information, so that the unknown routing information may be selectively populated to the gateway from the route server as the unknown routing information is needed by the gateway rather than as the unknown routing information becomes known by the route server, the unknown routing information comprising intra-site reachability information associated with the other network site on the network that is not associated with the gateway.

2. The method of claim 1, wherein the known routing information is information related to routes learned by the gateway.

3. The method of claim 1, wherein the gateway is associated with a first VPN site and the unknown routing information is associated with a second VPN site.

4. The method of claim 1, wherein the step of actively obtaining the unknown routing information comprises the steps of:
   transmitting, by the gateway to the route server, a data packet for a VPN site associated with the unknown routing information; and
   receiving, by the gateway, a routing update containing the unknown routing information from the route server.

5. The method of claim 1, wherein the step of actively obtaining unknown routing information comprises the steps of:
   transmitting, by the gateway to the route server, a data packet for a VPN site associated with the unknown routing information; and
   receiving, by the gateway, a data packet from the VPN site containing the unknown routing information.

6. The method of claim 1, wherein the step of actively obtaining unknown routing information comprises the steps of:
   transmitting, by the gateway to the route server, a request message requesting the unknown routing information; and
   receiving, by the gateway, a response message containing the unknown routing information.

7. The method of claim 6, wherein the response message is a routing update.

8. The method of claim 1, further comprising transmitting preference information indicative of routing information to be provided by the route server to the gateway on a periodic basis.

9. A method of exchanging intra-site reachability information of a plurality of Virtual Private Network (VPN) sites between the VPN sites as the intra-site reachability information is needed by the VPN sites, the intra-site reachability information including information associated with routes in the VPN sites, the method comprising the steps of:
   collecting, by a route server, intra-site reachability information from VPN sites;
   storing, by the route server, the intra-site reachability information to be distributed to the VPN sites at a later time; and
   when a portion of intra-site reachability information associated with one VPN site is unknown by one or more of the other VPN sites and required by the one or more of the other VPN sites, selectively distributing the required portion of the intra-site reachability information by the route server, on demand, to the one or more other VPN sites that need the portion of the intra-site reachability information;
   wherein the step of selectively distributing the portion of the required intra-site reachability information to the VPN site is performed by the route server:
   (1) in response to receipt of a data packet from the VPN site that is required to be addressed using the portion of the required reachability information; or
   (2) in response to receipt of a request for the portion of the required reachability information from the VPN site.

10. The method of claim 9, further comprising selectively distributing the intra-site reachability information according to preference information established by the VPN sites.

11. The method of claim 9, wherein the step of selectively distributing the portion of the required intra-site reachability information to the VPN sites on demand comprises the steps of:
    receiving a data packet from a first VPN site addressed to a second VPN site;
    establishing first intra-site reachability information from the first VPN site to the second VPN site; and
    transmitting the first intra-site reachability information to the first VPN site.

12. The method of claim 9, wherein the step of selectively distributing the portion of the required intra-site reachability information to the VPN sites on demand comprises the steps of:
    receiving a request message from a first VPN site containing a request for first intra-site reachability information about a second VPN site;
    establishing the first intra-site reachability information; and transmitting the first intra-site reachability information to the first VPN site.

13. A network element, comprising:

at least one communication port;

at least one processor configured to control the dissemination of routing information over the communication port, said at least one processor being configured to implement control logic designed to enable the network element to receive first intra-site reachability information about a first Virtual Private Network (VPN) site associated with a first gateway, store the first intra-site reachability information for distribution to a second gateway on demand, and in operation, when the second gateway needs access to the first intra-site reachability information, transmit at least a portion of the first intra-site reachability information to the second gateway as the first intra-site reachability information is needed by the second gateway:

(1) in response to receipt of a data packet from the second gateway that is required to be addressed using the first intra-site reachability information; or (2) in response to receipt of a request for the specific first intra-site reachability information from the second gateway;

wherein a portion of the first intra-site reachability information may be selectively populated to the second gateway after the portion of the first intra-site reachability information is needed by the gateway rather than having the first intra-site reachability information automatically populated to the second gateway as the first intra-site reachability information becomes known by the network element.

14. The network element of claim 13, wherein the first gateway is a first VPN gateway, the second gateway is a second VPN gateway, and wherein the first intra-site reachability information transmitted to the second VPN gateway relates to a path available on the first VPN site through the first VPN gateway.

15. The network element of claim 14, wherein the control logic is designed to cause the first intra-site reachability information to be transmitted to the second VPN gateway in response to receipt of a request message from the second VPN gateway.

16. The network element of claim 14, wherein the control logic is designed to cause the first intra-site reachability information to be transmitted to the second VPN gateway in response to receipt of a data message from the second VPN gateway addressed to the first VPN gateway.

17. The network element of claim 16, wherein the network element is further configured to forward the data message from the second VPN gateway to the first VPN gateway.

18. The network element of claim 13, wherein the at least one processor is further configured to implement second control logic designed to enable the network element to selectively distribute, on an automatic basis, at least a subset of the first intra-site reachability information, to selected other gateways according to policy associated with those gateways.

19. The network element of claim 18, wherein the policy is set by the other gateways.

* * * * *

UNITED STATES PATENT AND TRADEMARK OFFICE
CERTIFICATE OF CORRECTION

PATENT NO.         : 7,590,074 B1
APPLICATION NO.    : 11/001815
DATED              : September 15, 2009
INVENTOR(S)        : Dondeti et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 877 days.

Signed and Sealed this

Twenty-first Day of September, 2010

David J. Kappos
*Director of the United States Patent and Trademark Office*